(12) United States Patent
Dozeman et al.

(10) Patent No.: US 7,864,398 B2
(45) Date of Patent: Jan. 4, 2011

(54) ELECTRO-OPTICAL ELEMENT INCLUDING METALLIC FILMS AND METHODS FOR APPLYING THE SAME

(75) Inventors: Gary J. Dozeman, Zeeland, MI (US);
Henry A. Luten, Holland, MI (US);
George A. Neuman, Holland, MI (US);
William L. Tonar, Holland, MI (US);
Thomas F. Guarr, Holland, MI (US);
Leroy J. Kloeppner, Jenison, MI (US);
David L. Eaton, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 469 days.

(21) Appl. No.: 11/682,098

(22) Filed: Mar. 5, 2007

(65) Prior Publication Data

US 2007/0201122 A1 Aug. 30, 2007

Related U.S. Application Data

(63) Continuation-in-part of application No. 10/863,638, filed on Jun. 8, 2004, now Pat. No. 7,706,046.

(60) Provisional application No. 60/779,369, filed on Mar. 3, 2006, provisional application No. 60/810,921, filed on Jun. 5, 2006.

(51) Int. Cl.
*G02F 1/15* (2006.01)
*G02F 1/153* (2006.01)

(52) U.S. Cl. ........................ 359/265; 359/267; 359/900

(58) Field of Classification Search ......... 359/265–275, 359/900; 438/82, 99, 681; 257/40
See application file for complete search history.

(56) References Cited

U.S. PATENT DOCUMENTS

| | | | |
|---|---|---|---|
| 1,096,452 A | 5/1914 | Perrin | |
| 1,563,258 A | 11/1925 | Cunningham | |
| 2,457,348 A | 12/1948 | Chambers | |
| 2,561,582 A | 7/1951 | Marbel | |
| 3,280,701 A | 10/1966 | Donnelly et al. | |
| 3,847,701 A | 11/1974 | Fairbanks | |
| 4,274,078 A | 6/1981 | Isobe et al. | |

(Continued)

FOREIGN PATENT DOCUMENTS

CA 2028461 11/1994

(Continued)

OTHER PUBLICATIONS

Roberts, John K., "Dichroic Minors with Semi-active Covert Displays," Interior & Exterior Systems, International Body Engineering Conf. Sep. 21-23, 1993, pp. 65-69.

(Continued)

*Primary Examiner*—Timothy J Thompson
*Assistant Examiner*—Tuyen Q Tra
(74) *Attorney, Agent, or Firm*—Yakov Sidorin, Esq.; Quarles & Brady LLP

(57) ABSTRACT

A method for manufacturing an electrochromic element comprises providing a first substrate having first and second surfaces opposite one another and a first edge surface, providing a second substrate having third and fourth surfaces opposite one another and a second edge surface, wherein the third surfaces faces the second surface, and providing an electrochromic medium located between the first and second substrates, wherein the electrochromic medium has a light transmittance that is variable upon the application of electric field thereto. The method further complies applying a conductive layer on at least a portion of at least a select one of a first, second, third, and fourth surfaces and the first and second edge surfaces, wherein applying the conductive layer is accomplished at substantially atmospheric pressure and including applying at least a select one of metallic particles, an organometallic, a metallo-organic, and combinations thereof, and wherein the conductive layer has a bulk resistivity of less than or equal to 150 µΩ·cm. Other aspects of this invention comprise applying the conductive layer via ink jetting, ultrasonic spraying, auger pumping and jet pumping.

26 Claims, 4 Drawing Sheets

U.S. PATENT DOCUMENTS

| | | | |
|---|---|---|---|
| 4,733,335 A | 3/1988 | Serizawa et al. | |
| 4,803,599 A | 2/1989 | Trine et al. | |
| 4,827,086 A | 5/1989 | Rockwell | |
| 4,855,550 A | 8/1989 | Schultz, Jr. | |
| 4,859,813 A | 8/1989 | Rockwell | |
| 4,902,108 A | 2/1990 | Byker | |
| 5,014,167 A | 5/1991 | Roberts | |
| 5,016,996 A | 5/1991 | Ueno | |
| 5,017,903 A | 5/1991 | Krippelz, Sr. | |
| 5,052,163 A | 10/1991 | Czekala | |
| 5,059,015 A | 10/1991 | Tran | |
| 5,066,112 A | 11/1991 | Lynam et al. | |
| 5,069,535 A | 12/1991 | Baucke et al. | |
| 5,073,012 A | 12/1991 | Lynam | |
| 5,076,673 A | 12/1991 | Lynam et al. | |
| 5,115,346 A | 5/1992 | Lynam | |
| 5,151,824 A | 9/1992 | O'Farrell et al. | |
| 5,158,638 A | 10/1992 | Osanami et al. | |
| 5,177,031 A | 1/1993 | Buchmann et al. | |
| 5,207,492 A | 5/1993 | Roberts | |
| 5,239,406 A | 8/1993 | Lynam | |
| 5,253,109 A | 10/1993 | O'Farrell et al. | |
| 5,293,546 A | 3/1994 | Tadros et al. | |
| 5,313,335 A | 5/1994 | Gray et al. | |
| 5,355,284 A | 10/1994 | Roberts | |
| 5,361,190 A | 11/1994 | Roberts et al. | |
| 5,371,659 A | 12/1994 | Pastrick et al. | |
| 5,379,146 A | 1/1995 | Defendini | |
| 5,402,103 A | 3/1995 | Tashiro | |
| 5,436,741 A | 7/1995 | Crandall | |
| D363,920 S | 11/1995 | Roberts et al. | |
| 5,481,409 A | 1/1996 | Roberts | |
| 5,497,305 A | 3/1996 | Pastrick et al. | |
| 5,497,306 A | 3/1996 | Pastrick | |
| 5,523,877 A | 6/1996 | Lynam | |
| 5,528,422 A | 6/1996 | Roberts | |
| 5,587,699 A | 12/1996 | Faloon et al. | |
| 5,610,380 A | 3/1997 | Nicolaisen | |
| 5,619,374 A | 4/1997 | Roberts | |
| 5,619,375 A | 4/1997 | Roberts | |
| 5,632,551 A | 5/1997 | Roney et al. | |
| 5,649,756 A | 7/1997 | Adams et al. | |
| 5,668,663 A | 9/1997 | Varaprasad et al. | |
| 5,669,699 A | 9/1997 | Pastrick et al. | |
| 5,669,704 A | 9/1997 | Pastrick | |
| 5,669,705 A | 9/1997 | Pastrick et al. | |
| 5,724,187 A | 3/1998 | Varaprasad et al. | |
| 5,748,172 A | 5/1998 | Song et al. | |
| D394,833 S | 6/1998 | Muth | |
| 5,788,357 A | 8/1998 | Muth et al. | |
| 5,790,298 A | 8/1998 | Tonar | |
| 5,796,176 A | 8/1998 | Kramer et al. | |
| 5,798,575 A | 8/1998 | O'Farrell et al. | |
| 5,818,625 A | 10/1998 | Forgette et al. | |
| 5,823,654 A | 10/1998 | Pastrick et al. | |
| 5,825,527 A | 10/1998 | Forgette et al. | |
| 5,863,116 A | 1/1999 | Pastrick et al. | |
| 5,864,419 A | 1/1999 | Lynam | |
| 5,879,074 A | 3/1999 | Pastrick | |
| D409,540 S | 5/1999 | Muth | |
| 5,923,457 A | 7/1999 | Byker et al. | |
| 5,938,320 A | 8/1999 | Crandall | |
| 5,959,367 A | 9/1999 | O'Farrell et al. | |
| 6,005,724 A | 12/1999 | Todd | |
| 6,007,222 A | 12/1999 | Thau | |
| 6,045,243 A | 4/2000 | Muth et al. | |
| D425,466 S | 5/2000 | Todd et al. | |
| 6,062,920 A | 5/2000 | Jordan et al. | |
| 6,064,508 A | 5/2000 | Forgette et al. | |
| 6,068,380 A | 5/2000 | Lynn et al. | |
| D426,506 S | 6/2000 | Todd et al. | |
| D426,507 S | 6/2000 | Todd et al. | |
| D427,128 S | 6/2000 | Mathieu | |
| 6,074,077 A | 6/2000 | Pastrick et al. | |
| 6,076,723 A * | 6/2000 | I-Tsung Pan | 228/33 |
| 6,076,948 A | 6/2000 | Bukosky et al. | |
| D428,372 S | 7/2000 | Todd et al. | |
| D428,373 S | 7/2000 | Todd et al. | |
| 6,086,229 A | 7/2000 | Pastrick | |
| 6,093,976 A | 7/2000 | Kramer et al. | |
| D428,842 S | 8/2000 | Todd et al. | |
| D429,202 S | 8/2000 | Todd et al. | |
| D430,088 S | 8/2000 | Todd et al. | |
| 6,099,155 A | 8/2000 | Pastrick et al. | |
| 6,102,546 A | 8/2000 | Carter | |
| 6,111,683 A | 8/2000 | Cammenga et al. | |
| 6,111,684 A | 8/2000 | Forgette et al. | |
| 6,111,685 A | 8/2000 | Tench et al. | |
| 6,124,886 A | 9/2000 | DeLine et al. | |
| 6,142,656 A | 11/2000 | Kurth | |
| 6,146,003 A | 11/2000 | Thau | |
| 6,149,287 A | 11/2000 | Pastrick et al. | |
| 6,152,590 A | 11/2000 | Furst et al. | |
| 6,163,083 A | 12/2000 | Kramer et al. | |
| 6,166,848 A | 12/2000 | Cammenga et al. | |
| 6,170,956 B1 | 1/2001 | Rumsey et al. | |
| 6,175,164 B1 | 1/2001 | O'Farrell et al. | |
| 6,176,602 B1 | 1/2001 | Pastrick et al. | |
| 6,195,194 B1 | 2/2001 | Roberts et al. | |
| 6,206,553 B1 | 3/2001 | Boddy et al. | |
| 6,227,689 B1 | 5/2001 | Miller | |
| 6,239,899 B1 | 5/2001 | DeVries et al. | |
| 6,244,716 B1 | 6/2001 | Steenwyk et al. | |
| 6,249,369 B1 | 6/2001 | Theiste et al. | |
| 6,257,746 B1 | 7/2001 | Todd et al. | |
| 6,264,353 B1 | 7/2001 | Carraher et al. | |
| 6,276,821 B1 | 8/2001 | Pastrick et al. | |
| 6,280,069 B1 | 8/2001 | Pastrick et al. | |
| 6,296,379 B1 | 10/2001 | Pastrick | |
| 6,299,333 B1 | 10/2001 | Pastrick et al. | |
| 6,301,039 B1 | 10/2001 | Tench | |
| 6,317,248 B1 | 11/2001 | Agrawal et al. | |
| 6,336,737 B1 | 1/2002 | Thau | |
| 6,340,849 B1 | 1/2002 | Kramer et al. | |
| 6,340,850 B2 | 1/2002 | O'Farrell et al. | |
| 6,347,880 B1 | 2/2002 | Furst et al. | |
| 6,356,376 B1 | 3/2002 | Tonar et al. | |
| 6,379,013 B1 | 4/2002 | Bechtel et al. | |
| 6,407,468 B1 | 6/2002 | LeVesque et al. | |
| 6,407,847 B1 | 6/2002 | Poll et al. | |
| 6,420,800 B1 | 7/2002 | LeVesque et al. | |
| 6,426,568 B2 | 7/2002 | Turnbull et al. | |
| 6,441,943 B1 | 8/2002 | Roberts et al. | |
| 6,441,963 B2 | 8/2002 | Murakami et al. | |
| 6,449,082 B1 * | 9/2002 | Agrawal et al. | 359/275 |
| 6,471,362 B1 | 10/2002 | Carter et al. | |
| 6,512,203 B2 | 1/2003 | Jones et al. | |
| 6,519,824 B2 * | 2/2003 | Nagasaki et al. | 29/33 M |
| 6,606,183 B2 | 8/2003 | Ikai et al. | |
| 6,614,579 B2 | 9/2003 | Roberts et al. | |
| 6,621,616 B1 | 9/2003 | Bauer et al. | |
| 6,639,360 B2 | 10/2003 | Roberts et al. | |
| 6,650,457 B2 | 11/2003 | Busscher et al. | |
| 6,679,608 B2 | 1/2004 | Bechtel et al. | |
| 6,700,692 B2 | 3/2004 | Tonar et al. | |
| 6,737,629 B2 | 5/2004 | Nixon et al. | |
| 6,749,308 B1 | 6/2004 | Niendorf et al. | |
| 6,753,047 B1 * | 6/2004 | Athey | 428/1.21 |
| 6,755,542 B2 | 6/2004 | Bechtel et al. | |
| 6,805,474 B2 | 10/2004 | Walser et al. | |
| 6,831,268 B2 | 12/2004 | Bechtel et al. | |
| 6,849,165 B2 | 2/2005 | Kloppel et al. | |
| 6,870,656 B2 | 3/2005 | Tonar et al. | |
| 6,928,366 B2 | 8/2005 | Ockerse et al. | |

| | | | |
|---|---|---|---|
| 7,012,728 B2 * | 3/2006 | Morin et al. ............... 359/265 |
| 7,064,882 B2 | 6/2006 | Tonar et al. |
| 7,154,657 B2 | 12/2006 | Poll et al. |
| 7,255,451 B2 | 8/2007 | McCabe et al. |
| 7,285,260 B2 * | 10/2007 | Armand et al. ............ 423/306 |
| 7,287,868 B2 | 10/2007 | Carter et al. |
| 7,446,924 B2 * | 11/2008 | Schofield et al. ........... 359/267 |
| 2002/0126497 A1 | 9/2002 | Pastrick |
| 2002/0154379 A1 | 10/2002 | Tonar et al. |
| 2002/0171906 A1 | 11/2002 | Busscher et al. |
| 2003/0148024 A1 | 8/2003 | Kodas et al. |
| 2004/0028955 A1 | 2/2004 | Hoffman |
| 2004/0061920 A1 | 4/2004 | Tonar et al. |
| 2004/0095632 A1 | 5/2004 | Busscher et al. |
| 2004/0160657 A1 | 8/2004 | Tonar et al. |
| 2005/0007645 A1 | 1/2005 | Tonar et al. |
| 2005/0099693 A1 | 5/2005 | Schofield et al. |
| 2005/0195488 A1 | 9/2005 | McCabe et al. |
| 2005/0264891 A1 | 12/2005 | Uken et al. |
| 2005/0286132 A1 | 12/2005 | Tonar et al. |
| 2006/0001726 A1 | 1/2006 | Kodas et al. |
| 2006/0132885 A1 * | 6/2006 | Pichot et al. ............... 359/265 |

FOREIGN PATENT DOCUMENTS

| | | |
|---|---|---|
| EP | 0240226 | 10/1987 |
| EP | 0450162 | 12/1990 |
| EP | 0531143 | 3/1993 |
| EP | 1 628 310 | 2/2006 |
| GB | 2161440 | 1/1986 |
| WO | WO 8902135 | 3/1989 |
| WO | WO 9530495 | 11/1995 |
| WO | WO 9940039 | 8/1999 |
| WO | WO 0030893 | 6/2000 |
| WO | WO 03103338 | 12/2003 |

OTHER PUBLICATIONS

International Searching Authority, International Preliminary Report on Patentability, dated Sep. 9, 2008, in international application No. PCT/US07/05494.

International Searching Authority, International Search Report, dated Feb. 6, 2008, in international application No. PCT/US07/05638.

International Searching Authority, International Search Report, dated Apr. 2, 2008, in international application No. PCT/US/05520.

International Searching Authority, International Search Report, dated Sep. 27, 2008, in international application No. PCT/US08/71875.

Beate Giffo-Schmitt, Authorized Officer, International Preliminary Report on Patentability in application No. PCT/US2007/005520, mailed Sep. 18, 2008, WIPO, 10 pages.

Partial European Search Report in European Patent Application No. EP 07 75 2234; 5 pages.

* cited by examiner

ELECTRO-OPTICAL ELEMENT INCLUDING METALLIC FILMS AND METHODS FOR APPLYING THE SAME

CROSS REFERENCE TO RELATED APPLICATIONS

This application claims the benefit of U.S. Provisional Application No. 60/779,369, filed Mar. 3, 2006, entitled IMPROVED COATINGS AND REARVIEW ELEMENTS INCORPORATING THE COATINGS, and U.S. Provisional Application No. 60/810,921, filed Jun. 5, 2006, entitled ELECTROCHROMIC REARVIEW MIRROR ASSEMBLY INCORPORATING A DISPLAY/SIGNAL LIGHT, both of which are hereby incorporated herein by reference in their entirety, and is a continuation-in-part of U.S. patent application Ser. No. 10/863,638, filed Jun. 8, 2004, now U.S. Pat. No. 7,706,046 entitled REARVIEW MIRROR ELEMENT HAVING A CIRCUIT MOUNTED To THE REAR SURFACE OF THE ELEMENT.

BACKGROUND OF THE INVENTION

This invention relates to electrochromic elements as utilized within rearview mirror assemblies for motor vehicles, as well as within window assemblies, and more particularly, to improved electrochromic elements for use within such assemblies. More particularly, the present invention relates to electrochromic elements that include conductive layers deposited at atmospheric pressure without compromising associated bulk conductivity values.

Heretofore, various rearview mirrors for motor vehicles have been proposed which change from the full reflectance mode (day) to the partial reflectance mode(s) (night) for glare-protection purposes from light emanating from the headlights of vehicles approaching from the rear. Similarly, variable transmittance light filters have been proposed for use in architectural windows, skylights, within windows, sunroofs, and rearview mirrors for automobiles, as well as for windows or other vehicles such as aircraft windows. Among such devices are those wherein the transmittance is varied by thermochromic, photochromic, or electro-optic means (e.g., liquid crystal, dipolar suspension, electrophoretic, electrochromic, etc.) and where the variable transmittance characteristic affects electromagnetic radiation that is at least partly in the visible spectrum (wavelengths from about 3800 Å to about 7800 Å). Devices of reversibly variable transmittance to electromagnetic radiation have been proposed as the variable transmittance element in variable transmittance light-filters, variable reflectance mirrors, and display devices, which employ such light-filters or mirrors in conveying information.

Devices of reversibly variable transmittance to electromagnetic radiation, wherein the transmittance is altered by electrochromic means, are described, for example, by Chang, "Electrochromic and Electrochemichromic Materials and Phenomena," in *Non-emissive Electrooptic Displays*, A. Kmetz and K. von Willisen, eds. Plenum Press, New York, N.Y. 1976, pp. 155-196 (1976) and in various parts of *Electrochromism*, P. M. S. Monk, R. J. Mortimer, D. R. Rosseinsky, VCH Publishers, Inc., New York, N.Y. (1995). Numerous electrochromic devices are known in the art. See, e.g. Manos, U.S. Pat. No. 3,451,741; Bredfeldt et al., U.S. Pat. No. 4,090,358; Clecak et al., U.S. Pat. No. 4,139,276; Kissa et al., U.S. Pat. No. 3,453,038; Rogers, U.S. Pat. Nos. 3,652,149, 3,774,988 and 3,873,185; and Jones et al., U.S. Pat. Nos. 3,282,157, 3,282,158, 3,282,160 and 3,283,656. In addition to these devices, there are commercially available electrochromic devices and associated circuitry, such as those disclosed in U.S. Pat. No. 4,902,108, entitled "SINGLE-COMPARTMENT, SELF-ERASING, SOLUTION-PHASE ELECTROCHROMIC DEVICES SOLUTIONS FOR USE THEREIN, AND USES THEREOF," issued Feb. 20, 1990, to H. J. Byker; Canadian Patent No. 1,300,945, entitled "AUTOMATIC REARVIEW MIRROR SYSTEM FOR AUTOMOTIVE VEHICLES," issued May 19, 1992, to J. H. Bechtel et al.; U.S. Pat. No. 5,128,799, entitled "VARIABLE REFLECTANCE MOTOR VEHICLE MIRROR," issued Jul. 7, 1992, to H. J. Byker; U.S. Pat. No. 5,202,787, entitled "ELECTROOPTIC DEVICE," issued Apr. 13, 1993, to H. J. Byker et al.; U.S. Pat. No. 5,204,778, entitled "CONTROL SYSTEM FOR AUTOMATIC REARVIEW MIRRORS," issued Apr. 20, 1993, to J. H. Bechtel; U.S. Pat. No. 5,278,693, entitled "TINTED SOLUTION-PHASE ELECTROCHROMIC MIRRORS," issued Jan. 11, 1994, to D. A. Theiste et al.; U.S. Pat. No. 5,280,380, entitled "UV-STABILIZED COMPOSITIONS AND METHODS," issued Jan. 18, 1994, to H. J. Byker; U.S. Pat. No. 5,282,077, entitled "VARIABLE REFLECTANCE MIRROR," issued Jan. 25, 1994, to H. J. Byker; U.S. Pat. No. 5,294,376, entitled "BIPYRIDINIUM SALT SOLUTIONS," issued Mar. 15, 1994, to H. J. Byker; U.S. Pat. No. 5,336,448, entitled "ELECTROCHROMIC DEVICES WITH BIPYRIDINIUM SALT SOLUTIONS," issued Aug. 9, 1994, to H. J. Byker; U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; and U.S. Pat. No. 5,451,822, entitled "ELECTRONIC CONTROL SYSTEM," issued Sep. 19, 1995, to J. H. Bechtel et al. Each of these patents is commonly assigned with the present invention and the disclosures of each, including the references contained therein, are hereby incorporated herein in their entirety by reference. Such electrochromic devices may be utilized in a fully integrated inside/outside rearview mirror system or as separate inside or outside rearview mirror systems, and/or variable transmittance windows.

FIG. 1 shows the cross-section of a typical electrochromic mirror device 10, having a front planar substrate 12 and a rear planar substrate 16, and of which the general layout is known. A transparent conductive coating 14 is provided on the rear surface of the front substrate 12, and another transparent conductive coating 18 is provided on the front surface of rear substrate 16. A reflector 20, typically comprising a silver metal layer 20a covered by a protective copper metal layer 20b, and one or more layers of protective paint 20c, is disposed on the rear surface of the rear substrate 16. For clarity of description of such a structure, the front surface 12a of the front substrate 12 is sometimes referred to as the first surface, and the inside (or rear) surface 12b of the front substrate 12 is sometimes referred to as the second surface, the inside surface 16a of the rear substrate 16 is sometimes referred to as the third surface, and the back surface 16b of the rear substrate 16 is sometimes referred to as the fourth surface. In the illustrated example, the front substrate further includes an edge surface 12c, while the rear substrate includes an edge surface 16c. The front and rear substrates 12,16 are held in a parallel and spaced-apart relationship by seal 22, thereby creating a chamber 26. The electrochromic medium 24 is contained in space or chamber 26. An electrochromic medium 24 is in direct contact with transparent electrode layers 14 and 18, through which passes electromagnetic radiation whose intensity is reversibly modulated in the device by a variable voltage or potential applied to electrode layers 14 and 18 through clip contacts and an electronic circuit (not shown).

The electrochromic medium 24 placed in chamber 26 may include surface-confined, electrode position-type or solution-phase-type electrochromic materials and combinations thereof. In an all solution-phase medium, the electrochemical properties of the solvent, optional inert electrolyte, anodic materials, cathodic materials, and any other components that might be present in the solution are preferably such that no significant electrochemical or other changes occur at a potential difference which oxidizes anodic material and reduces the cathodic material other than the electrochemical oxidation of the anodic material, electrochemical reduction of the cathodic material, and the self-erasing reaction between the oxidized form of the anodic material and the reduced form of the cathodic material.

In most cases, when there is no electrical potential difference between transparent conductors 14 and 18, the electrochromic medium 24 in chamber 26 is essentially colorless or nearly colorless, and incoming light ($I_0$) enters through the front substrate 12, passes through the transparent coating 14, the electrochromic medium 24 in chamber 26, the transparent coating 18, the rear substrate 16, and reflects off the layer 20a and travels back through the device and out the front substrate 12. Typically, the magnitude of the reflected image ($I_R$) with no electrical potential difference is about 45 percent to about 85 percent of the incident light intensity ($I_0$). The exact value depends on many variables outlined below, such as, for example, absorption by the various components, the residual reflection ($I'_R$) from the front face of the front substrate, as well as secondary reflections from the interfaces between the front substrate 12 and the front transparent electrode 14, the front transparent electrode 14 and the electrochromic medium 24, the electrochromic medium 24 and the second transparent electrode 18, and the second transparent electrode 18 and the rear substrate 16. These reflections are well known in the art and are due to the difference in refractive indices between one material and another as the light crosses the interface between the two. If the front substrate and the back element are not parallel, then the residual reflectance ($I'_R$) or other secondary reflections will not superimpose with the reflected image ($I_R$) from mirror surface 20a, and a double image will appear (where an observer would see what appears to be double (or triple) the number of objects actually present in the reflected image).

There are minimum requirements for the magnitude of the reflected image depending on whether the electrochromic mirrors are placed on the inside or the outside of the vehicle. For example, according to current requirements from most automobile manufacturers, inside mirrors preferably have a high end reflectivity of at least 70 percent, and outside mirrors must have a high end reflectivity of at least 35 percent.

The electrode layers 14 and 18 are connected to electronic circuitry which is effective to electrically energize the electrochromic medium, such that when a potential is applied across the conductors 14 and 18, the electrochromic medium in chamber 26 darkens, such that incident light ($I_0$) is attenuated as the light passes toward the reflector 20a and as it passes back through after being reflected. By adjusting the potential difference between the transparent electrodes, such a device can function as a "gray-scale" device, with continuously variable transmittance over a wide range. For solution-phase electrochromic systems, when the potential between the electrodes is removed or returned to zero, the device spontaneously returns to the same, zero-potential, equilibrium color and transmittance as the device had before the potential was applied. Other electrochromic materials are available for making electrochromic devices. For example, the electrochromic medium may include electrochromic materials that are solid metal oxides, redox active polymers, and hybrid combinations of solution-phase and solid metal oxides or redox active polymers; however, the above-described solution-phase design is typical of most of the electrochromic devices presently in use.

Even before a fourth surface reflector electrochromic mirror such as that show in FIG. 1, was commercially available, various groups researching electrochromic devices had discussed moving the reflector from the fourth surface to the third surface. Such a design has advantages in that it should, theoretically, be easier to manufacture because there are fewer layers to build into a device, i.e., the third surface transparent electrode is not necessary when there is a third surface reflector/electrode. Although this concept was described as early as 1966, no group had commercial success because of the exacting criteria demanded from a workable auto-dimming mirror incorporating a third surface reflector. U.S. Pat. No. 3,280,701, entitled "OPTICALLY VARIABLE ONE-WAY MIRROR," issued Oct. 25, 1966, to J. F. Donnelly et al. has one of the earliest discussions of a third surface reflector for a system using a pH-induced color change to attenuate light.

U.S. Pat. No. 5,066,112, entitled "PERIMETER COATED, ELECTRO-OPTIC MIRROR," issued Nov. 19, 1991, to N. R. Lynam et al., teaches an electro-optic mirror with a conductive coating applied to the perimeter of the front and rear glass elements for concealing the seal. Although a third surface reflector is discussed therein, the materials listed as being useful as a third surface reflector suffer from the deficiencies of not having sufficient reflectivity for use as an inside mirror, and/or not being stable when in contact with a solution-phase electrochromic medium containing at least one solution-phase electrochromic material.

Others have broached the topic of a reflector/electrode disposed in the middle of an all solid state-type device. For example, U.S. Pat. Nos. 4,762,401, 4,973,141, and 5,069,535 to Baucke et al. teach an electrochromic mirror having the following structure: a glass element, a transparent indium-tin-oxide electrode, a tungsten oxide electrochromic layer, a solid ion conducting layer, a single layer hydrogen ion-permeable reflector, a solid ion conducting layer, a hydrogen ion storage layer, a catalytic layer, a rear metallic layer, and a back element (representing the conventional third and fourth surface). The reflector is not deposited on the third surface and is not directly in contact with electrochromic materials, certainly not at least one solution-phase electrochromic material and associated medium. Consequently, it is desirable to provide an improved high reflectivity electrochromic rearview mirror having a third surface reflector/electrode in contact with a solution-phase electrochromic medium containing at least one electrochromic material. Electrochromic windows that have been proposed, typically include an electrochromic cell similar to that shown in FIG. 1, but without layer 20a, 20b and 20c.

Whether deposited on the first, second, third, fourth or edge surfaces of the substrates, metal containing films or layers that are conductive, reflective, or both are significantly useful in the construction of electrochromic electro-optic devices as well as the integrated electrochromic devices packaged therewith. Generally, the versatility and utility of a metal film or multiple layers of metal films increases: as the conductivity increases; as the adhesive properties increase; as the intricacy of the pattern of the layer increases; as the reflectivity increases while maintaining a color neutral reflection; as the chemical and electrochemical stability increases; and, as the ease of application increases.

Various attempts have been made to provide an electrochromic element with conductive layers on the surfaces of the substrates associated with an electrochromic element as discussed above. One such method includes utilizing metal particle load resins such as epoxy resins loaded with silver flake. However, the conductivity of such systems is limited by the sheer number of particle to particle connections that must be made in order to conduct current. Each particle to particle connection adds electrical resistance, thereby limiting the usefulness of metal particle loaded resins. Currently, it is not possible to obtain mirror-quality specular light reflection from such films since the random orientation of the relatively large metal particles promotes diffuse reflection. In order to avoid these limitations, it is desirable to deposit metal films that more closely approach bulk metal properties. Metal films that more closely approach bulk metal properties for conduction and reflection adhere well to applicable substrates, are chemically and electro-chemically durable, and can be deposited using vacuum processes such as sputtering or evaporation. However, the equipment for vacuum-based processes is expensive to purchase, operate, and maintain. It is further difficult to deposit pattern films using vacuum-based processes. One method of patterning vacuum-applied metal films requires that the metal be applied through a mask during deposition. Such masks can be expensive to machine and difficult to maintain. Another method of patterning a vacuum-applied metal film requires that the metal be removed after deposition by additional processing steps such as laser ablation or chemical etching. Aside from increasing the complexity of the overall manufacturing process, the aforementioned sputtering or evaporation processes are also not efficient in the use of metal or metal precursors. Specifically, a significant amount of metal is deposited on the masking and surrounding structure rather than on the desired device during the vacuum processing, the reclamation of the which is costly and time consuming.

It is therefore desirable to produce metal films within electrochromic or other electro-optic devices under near atmospheric conditions, and specifically atmospheric pressure, and that provide adequate conductive, adhesive and reflective properties, while maintaining a color neutral reflection, adequate chemical and electrochemical stability, and simultaneously allowing for an increase in application control.

SUMMARY OF THE INVENTION

One aspect of the present invention includes a method of manufacturing an electrochromic element that comprises providing a first substrate having a first surface, a second surface opposite the first surface, and a first edge surface, providing a second substrate having a third surface facing the second surface, a fourth surface opposite the third surface, and a second edge surface, and providing an electrochromic medium between the first and second substrates wherein the electrochromic medium has a light transmittance that is variable upon the application of an electric field thereto. The method further includes applying a conductive layer on at least a portion of at least a select one of the first surface, the second surface, the first edge surface, the third surface, the fourth surface and the second edge surface, wherein applying the conductive layer is accomplished at substantially atmospheric pressure and includes applying at least a select one of metallic particles, an inorganal metallic, a metallo-organic, and combinations thereof, and wherein the conductive layer has a bulk conductivity of less than or equal to 150 $\mu\Omega\cdot$cm.

Another aspect of the present inventive method for manufacturing an electrochromic element comprises providing a first substrate having a first surface, a second surface opposite the first surface, and a first edge surface, providing a second substrate having a third surface facing the second surface, a fourth surface opposite the third surface, and a second edge surface, and providing an electrochromic medium between the first and second substrates wherein the electrochromic medium has a light transmittance that is variable upon the application of an electric field thereto. The method further includes inkjet printing a conductive layer on at least a portion of at least a select one of the first surface, the second surface, the first edge surface, the third surface, the fourth surface and the second edge surface.

Yet another aspect of the present inventive method includes providing a first substrate having a first surface, a second surface opposite the first surface, and a first edge surface, providing a second substrate having a third surface facing the second surface, a fourth surface opposite the third surface, and a second edge surface, and providing an electrochromic medium between the first and second substrates wherein the electrochromic medium has a light transmittance that is variable upon the application of an electric field thereto. The method further includes ultrasonic spraying a conductive layer on at least a portion of at least a select one of the first surface, the second surface, the first edge surface, the third surface, the fourth surface and the second edge surface.

Still yet another aspect of the present inventive method comprises providing a first substrate having a first surface, a second surface opposite the first surface, and a first edge surface, providing a second substrate having a third surface facing the second surface, a fourth surface opposite the third surface, and a second edge surface, and providing an electrochromic medium between the first and second substrates wherein the electrochromic medium has a light transmittance that is variable upon the application of an electric field thereto. The method further includes applying a conductive layer on at least a portion of at least a select one of the first surface, the second surface, the first edge surface, the third surface, the fourth surface and the second edge surface, wherein applying of the conductive layer includes at least a select one of auger pumping and jet pumping.

Another aspect of the present inventive method for manufacturing an electrochromic element comprises providing a first substrate having a first surface, a second surface opposite the first surface, and a first edge surface, providing a second substrate having a third surface facing the second surface, a fourth surface opposite the third surface, and a second edge surface, and providing an electrochromic medium between the first and second substrates wherein the electrochromic medium has a light transmittance that is variable upon the application of an electric field thereto. The method further includes applying a conductive layer on at least a portion of at least a select one of the first surface, the second surface, the first edge surface, the third surface, the fourth surface and the second edge surface, wherein applying of the conductive layer includes at least a select one of combustion chemical vapor deposition, flame spray deposition, and laser sintering.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 3 is an enlarged cross-sectional view of an electrochromic mirror incorporating a third surface reflector/electrode taken along the line III-III, FIG. 2;

DETAILED DESCRIPTION OF THE PREFERRED EMBODIMENTS

Figure 2:
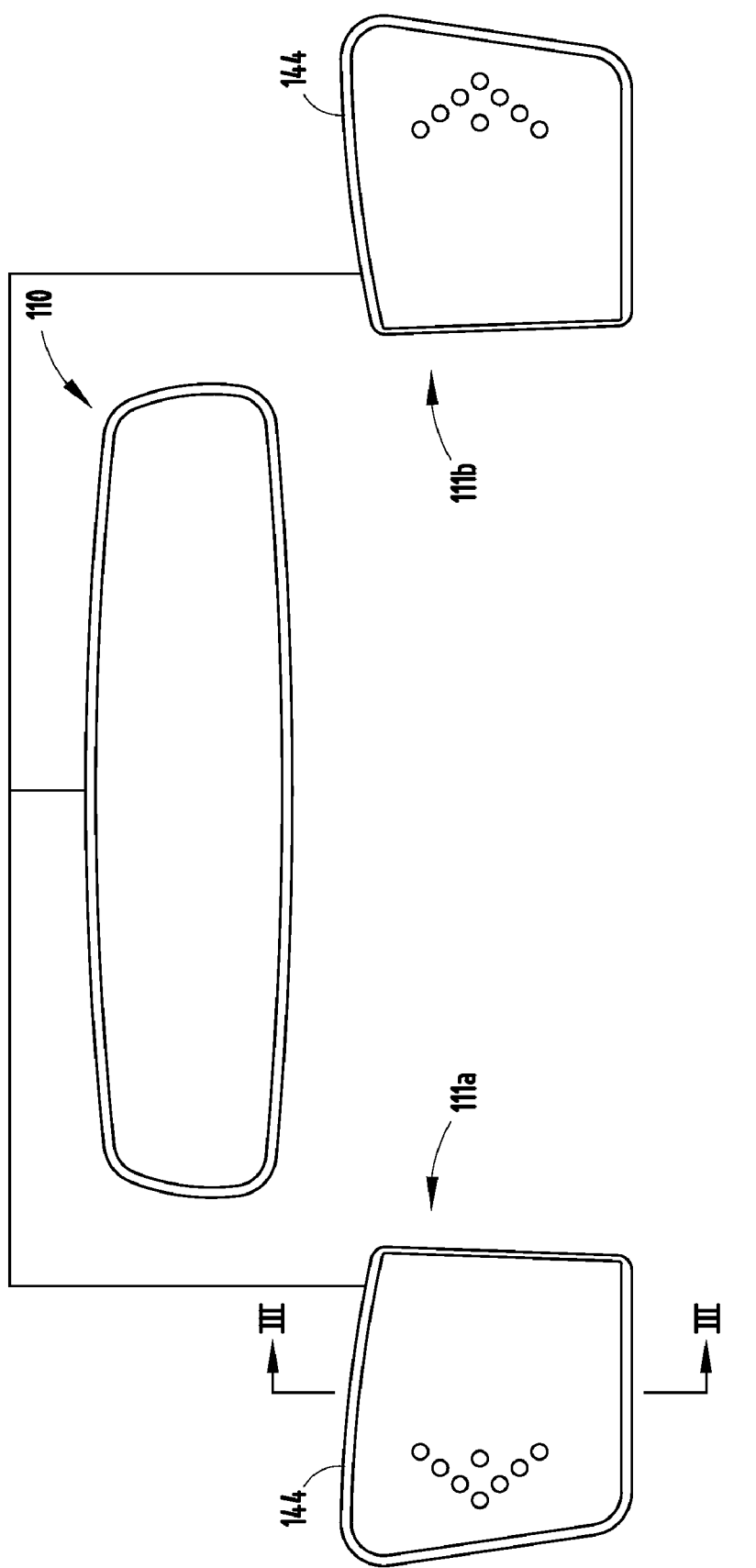
FIG. 2 is a front elevational view schematically illustrating an inside/outside electrochromatic rearview mirror system for motor vehicles.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

FIG. 2 shows a front elevational view schematically illustrating an inside mirror assembly 110 and two outside rearview mirror assemblies 111a and 111b for the driver-side and passenger-side, respectively, all of which are adapted to be installed on a motor vehicle in a conventional manner and where the mirrors face the rear of the vehicle and can be viewed by the driver of the vehicle to provide a rearward view. While mirror assemblies in general are utilized herein to describe the present invention, it is noted that this invention is equally applicable to the construction of electrochromic windows. The inside mirror assembly 110 and the outside rearview mirror assemblies 111a, 111b may incorporate light-sensing electronic circuitry of the type illustrated and described in the above-referenced Canadian Patent No. 1,300,945, U.S. Pat. No. 5,204,778, or U.S. Pat. No. 5,451,822, and other circuits capable of sensing glare and ambient light and supplying a drive voltage to the electrochromic element. In the illustrated example, electrical circuitry 150 is connected to and allows control of the potential to be applied across the reflector/electrode 120 and transparent electrode 128, such that electrochromic medium 126 will darken and thereby attenuate various amounts of light traveling therethrough and then vary the reflectance of the mirror containing the electrochromic medium 126. The mirror assemblies 110, 111a, 111b are similar in that like numbers identify components of the inside and outside mirrors. These components may be slightly different in configuration, but function in substantially the same manner and obtain substantially the same results as similarly numbered components. For example, the shape of the front glass element of the inside mirror 110 is generally longer and narrower than the outside mirrors 111a, 111b. There are also some different performance standards placed on the inside mirror 110 compared with the outside mirrors 111a, 111b. For example, the inside mirror 110 generally, when fully cleared, should have a reflectance value of about 70 percent to about 85 percent or higher, whereas the outside mirrors often have a reflectance of about 50 percent to about 65 percent. Also, in the United States (as supplied by the automobile manufacturers), the passenger-side mirror 111b typically has a spherically bent or convex shape, whereas the driver-side mirror 111a and the inside mirror 110 presently must be flat. In Europe, the driver-side mirror 111a is commonly flat or aspheric, whereas the passenger-side mirror 111b has a convex shape. In Japan, both of the outside mirrors 111a, 111b have a convex shape. The following description is generally applicable to all mirror assemblies of the present invention, while the general concepts are equally applicable to the construction of electrochromic windows.

FIG. 3 shows a cross-sectional view of the mirror assembly 111a having a front transparent substrate 112 having a front surface 112a and a rear surface 112b, and a rear substrate space 114 having a front surface 114a and a rear surface 114b. For clarity of description of such a structure, the following designations will be used hereinafter. The front surface 112a of the front substrate will be referred to as the first surface 112a, and the back surface 112b of the front substrate as the second surface 112b. The front surface 114a of the rear substrate will be referred to as the third surface 114a, and the back surface 114b of the rear substrate as the fourth surface 114b. The front substrate 112 further includes an edge surface 112c, while the rear substrate 114 further includes an edge surface 114c. A chamber 125 is defined by a layer of transparent conductor 128 (carried on the second surface 112b), a reflector/electrode 120 (disposed on the third surface 114a), and an inner circumferential wall 132 of a sealing member 116. An electrochromic medium 126 is contained within the chamber 125.

Figure 1:
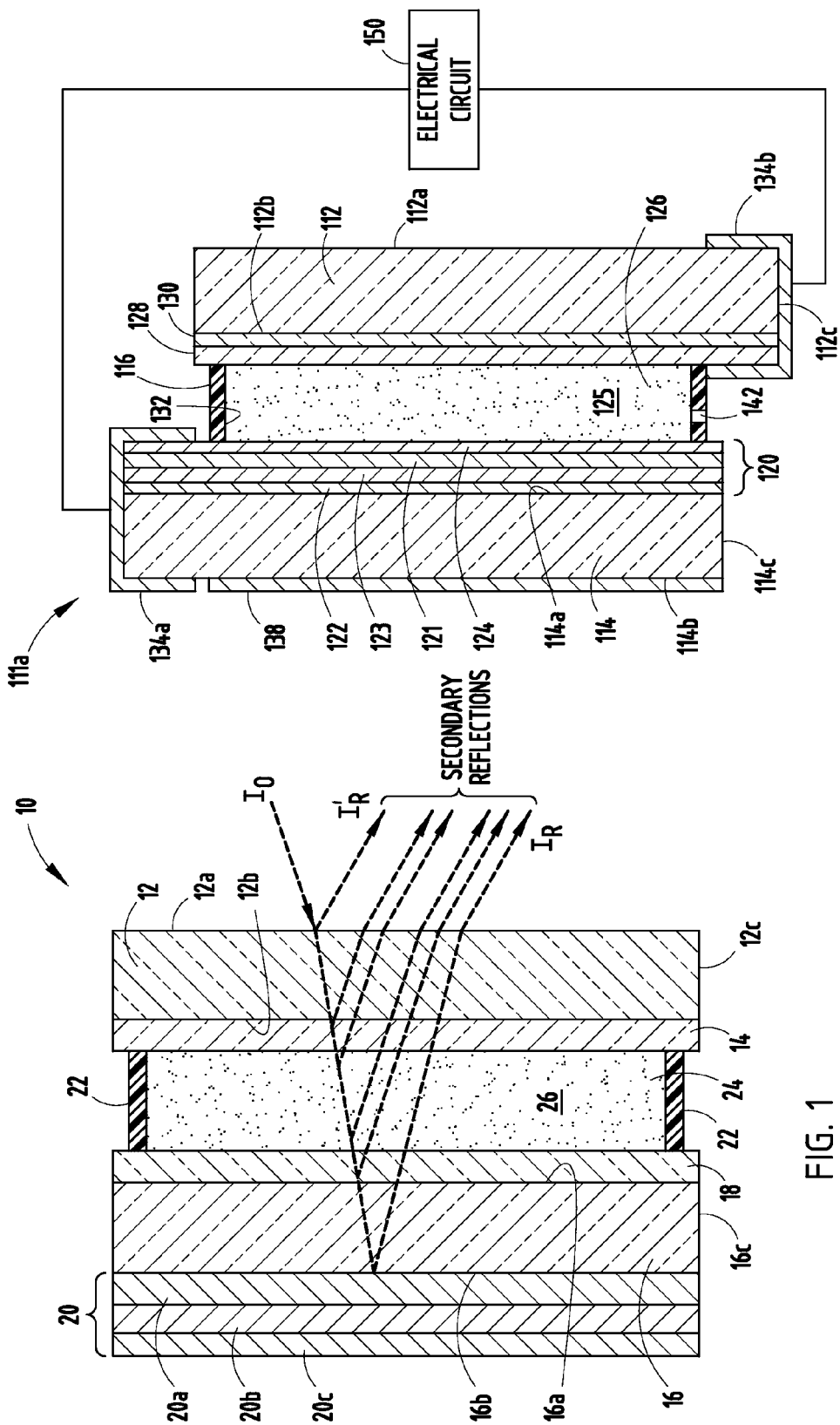
FIG. 1 is an enlarged cross-sectional view of a prior art electrochromic mirror assembly incorporating a fourth surface reflector.

As broadly used and described herein, the reference to an electrode or layer as being "carried" on or applied to a surface of an element, refers to both electrodes or layers that are disposed directly on the surface of an element or disposed on another coating, layer or layers that are disposed directly on the surface of the element. Further, it is noted that the mirror assembly 111a is described for explanatory purposes only, and that the specific components and elements may be rearranged therein, such as the configuration illustrated in FIG. 1, and those configurations known for electrochromic windows.

The front transparent substrate 112 may be any material which is transparent and has sufficient strength to be able to operate in the conditions, e.g., varying temperatures and pressures, commonly found in the automotive environment. The front substrate 112 may comprise any type of borosilicate glass, soda lime glass, float glass, or any other material, such as, for example, a polymer or plastic, that is transparent in the visible region of the electromagnetic spectrum. The front substrate 112 is preferably a sheet of glass. The rear substrate 114 must meet the operational conditions outlined above, except that it does not need to be transparent in all applications, and therefore may comprise polymers, metals, glass, ceramics, and preferably is a sheet of glass.

The coatings of the third surface 114a are sealably bonded to the coatings on the second surface 112b in a spaced-apart and parallel relationship by the seal member 116 disposed near the outer perimeter of both the second surface 112b and the third surface 114a. The seal member 116 may be any material that is capable of adhesively bonding the coatings on the second surface 112b to the coatings on the third surface 114a to seal the perimeter such that the electrochromic material 126 does not leak from within the chamber 125. Optionally, the layer of transparent conductive coating 128 and the layer of reflector/electrode 120 may be removed over a portion where the seal member 116 is disposed (not the entire portion, otherwise the drive potential could not be applied to the two coatings). In such a case, the seal member 116 must bond well to glass.

The performance requirements for the perimeter seal member 116 used in an electrochromic device are similar to those for a perimeter seal used in a liquid crystal device (LCD), which are well known in the art. The seal 116 must have good adhesion to glass, metals and metal oxides; must have low permeabilities for oxygen, moisture vapor, and other detrimental vapors and indium; and must not interact with or poison the electrochromic or liquid crystal material it is meant to contain and protect. The perimeter seal 116 can be applied by means commonly used in the LCD industry, such as by silk-screening or dispensing. Totally hermetic seals, such as those made with glass frit or solder glass, can be used, but the high temperatures involved in processing (usually near 450° C.) this type of seal can cause numerous problems, such as glass substrate warpage, changes in the properties of transparent conductive electrode, and oxidation or degradation of the reflector. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 116 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 21Z, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812 S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif.

The electrochromic medium 126 is capable of attenuating light traveling therethrough and has at least one solution-phase electrochromic material in intimate contact with the reflector/electrode 120 and at least one additional electroactive material that may be solution-phased, surface-confined, while one that plates out onto a surface. However, the presently preferred medium are solution-phased redox electrochromics, such as those disclosed in U.S. Pat. Nos. 4,902,108; 5,128,799; 5,278,693; 5,280,380; 5,282,077; 5,294,376; and 5,336,448. U.S. Pat. No. 6,020,987 entitled "AN IMPROVED ELECTRO-CHROMIC MEDIUM CAPABLE OF PRODUCING A PRE-SELECTED COLOR, DISCLOSES ELECTRO-CHROMIC MEDIUM THAT ARE PERCEIVED TO BE GREY THROUGH THEIR NORMAL RANGE OF OPERATION." The entire disclosure of this patent is hereby incorporated by reference herein. If a solution-phase electrochromic medium is utilized, it may be inserted into chamber 125 through a sealable fill port 142 through well-known techniques.

The layer of a transparent electrically conductive material 128 is deposited on the second surface 112b to act as an electrode. The transparent conductive material 128 may be any material which bonds well to front substrate 112, is resistant to corrosion to any materials within the electrochromic device, resistant to corrosion by the atmosphere, has minimal diffuse or specular reflectance, high light transmission, near neutral coloration, and good electrical conductance. The transparent conductive material 128 may be fluorine-doped tin oxide, doped zinc oxide, indium zinc oxide ($Zn_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, or other transparent conductors. Generally, the conductance of transparent conductive material 128 will depend on its thickness and composition. If desired, an optional layer or layers of a color suppression material 130 may be deposited between the transparent conductive material 128 and the second surface 112b to suppress the reflection of any unwanted portions of the electromagnetic spectrum.

A combination reflector/electrode 120 is disposed on the third surface 114a and comprises at least one layer of a reflective material 121 which serves as a mirror reflectance layer and also forms an integral electrode in contact with and in a chemically and electrochemically stable relationship with any constituents in an electrochromic medium. As stated above, the conventional method of building electrochromic devices was to incorporate a transparent conductive material on the third surface as an electrode, and place a reflector on the fourth surface. By combining the "reflector" and "electrode" and placing both on the third surface, several advantages arise which not only make the device manufacture less complex, but also allow the device to operate with higher performance. For example, the combined reflector/electrode 120 on the third surface 114a generally has higher conductance than a conventional transparent electrode and previously used reflector/electrodes, which allows greater design flexibility. One can either change the composition of the transparent conductive electrode 128 on the second surface 112b to one that has lower conductivity (being cheaper and easier to produce and manufacture) while maintaining coloration speeds similar to that obtainable with a fourth surface reflector device, while at the same time decreasing substantially the overall cost and time to produce the electrochromic device. If, however, performance of a particular design is of utmost importance, a moderate to high conductivity transparent electrode can be used on the second surface, such as, for example, ITO, IMI, etc. The combination of the high conductivity (i.e., less than 250 Ohms/square, preferably less than 15 Ohms/square) reflector/electrode 120 on the third surface 114a and the high conductivity transparent electrode 128 on the second surface 112b will not only produce an electrochromic device with more even overall coloration, but will also allow for increased speed of coloration and clearing. Furthermore, in fourth surface reflector mirror assemblies there are two transparent electrodes with relatively low conductivity, and in previously used third surface reflector mirrors there is a transparent electrode and a reflector/electrode with relatively low conductivity and, as such, a long buss bar on the front and rear substrate to bring current in and out is necessary to ensure adequate coloring speed.

In the illustrated example, a resistive heater 138 is disposed on the fourth glass surface 114b. Electrically conductive spring clips 134a, 134b are placed on the coated glass sheets 112, 114 to make electrical contact with exposed areas of the transparent conductive coating 128 (clip 134b) and the third surface reflector/electrode 120 (clip 134a). Suitable electrical conductors (not shown) may be soldered or otherwise connected to the spring clips 134a, 134b so that a desired voltage may be applied to the device from a suitable power source.

Figure 4:
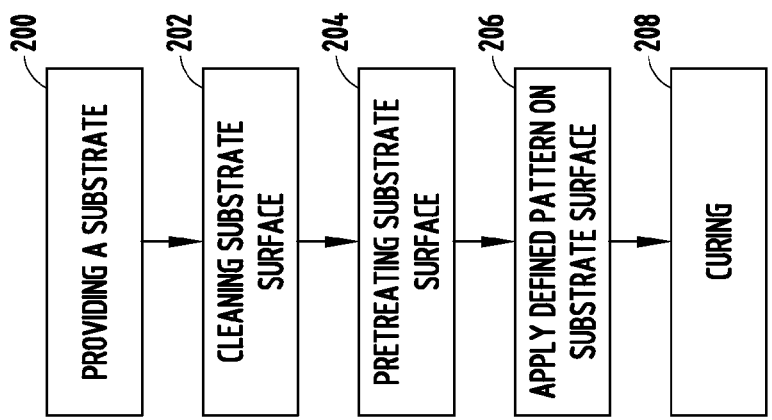
FIG. 4 is a flow chart illustrating the sequence of the present inventive method.

The present inventive process (FIG. 4) for manufacturing the electrochromic elements as described herein include the steps of providing 200 a substrate as described above, cleaning 202 a surface of the substrate to which the conductive layer is to be applied, alternatively pretreating 204 the surface of the substrate, applying 206 the conductive layer on the substrate surface in a defined pattern, and alternatively curing 208 the conductive layer subsequent to application thereof.

Cleaning 202 of the substrate surface may be accomplished with any well known glass-cleaning technique, including chemical cleaners, polishing, etching and the like. The surface of the substrate to which the conductive layers are applied may alternatively be pretreated 204 to cause hydrophilic and/or hydrophobic reaction of the metal layer when it is applied within a solution.

Applying 206 the conductive layer to a selected area of the substrate may be accomplished via a plurality of methods and techniques. Specifically, the conductive metal layer may be applied to the surface of the substrate by an inkjetting process, ultrasonic spraying, auger or jetting pumps, or similar dispensing methods, accomplished at atmospheric conditions, and specifically without the application of a vacuum. These methods include the application of metallic particles (preferable metallic nanoparticles), organo metallics, metallo-organics, and combinations thereof. Each of the materials as deposited may be cured 208 in sito, such as by preheating the associated substrate, and/or subsequently cured to form the final metal conductive layer.

Examples of applications of metal films or multiple layers of metal films within electrochromic devices applied via the present inventive techniques include, but are not limited to, electrical bus conductors; electrical resistance heater film and/or bus systems; metal line, stripe, grid or patterns; conductive traces for electronic circuitry; base layer providing enhanced solder wetting; reflective or transreflective mirror-like metal films; and metal film rings. Electrical bus conductors are generally positioned about the perimeter of the associated electrochromic device. The present inventive technique allows for positioning of the bus conductor on any of following: surface one, surface two, surface three, surface four and/or the edges of either of the substrates. Further, the technique could be used to apply the bus to the edges of either of the substrates and could overlap and electrically connect to the conductive areas of surface one, two, three, or four. Further, as the metallic bus film as applied via the present inventive technique exhibits improved adhesion to the substrate, it may be positioned under the electrochromic device seal, where the seal can than overcoat and protect the metallic bus from corrosion and the area occupied by the seal can be combined to minimize the overall combined footprint thereof. In the present example, it is desirable for the electrical resistance of the bus to be less than 10 ohms per linear foot, more preferably less than 5 ohms per linear foot, and most preferably less than 1 ohm per linear foot.

An electrical resistance heater film and/or bus system applied via the present inventive technique is adapted to uniformly heat and/or defrost an electrochromic device. As these metal films must be in good thermal contact with the device substrate, it is preferred that the metal films be patterned and applied directly to one of the surfaces of the electrochromic device which is provided for by the present inventive method.

Another application of the methods disclosed herein includes providing a metal line, stripe, grid or pattern to enhance the electrical conductivity of an associated surface of one or both of electrodes 120 and 128. The enhanced conductivity provided by the metal aids the coloring and clearing of the associated electrochromic device. By applying the present inventive method, areas of the electrochromic device are made to color or clear selectively or more quickly than other comparative areas by adjusting the pattern of the deposited metal film. This method proves particularly useful for enhancing the conductivity of transparent conductive oxides (TCO) that are inherently much less conductive than most metals. To minimize the visibility of the pattern metal on or under the TCO surface, it is desirable to have the pattern features be less than 5 mm wide, more preferably less than 1 mm wide and most preferably less than 0.5 mm wide. A metallic line, stripe, grid and/or pattern may also be applied under or over a reflective film to enhance or selectively alter the associated electrical conductivity and performance as an electrode.

Another application of the present inventive method is to provide a metallic film that may be patterned and utilized as conductive traces for electronic circuitry. The electronic circuitry may be applied directly onto the electrochromic substrate or other substrates such as those conventionally used in the printed circuit board industry, such as epoxy fiberglass laminations, polyimide films, or polyester films. These metal films may be deposited on the substrate first with the associated electrical components being subsequently attached to the substrate and electrically connected to the metal film conductive traces. Alternatively, the electrical components could be mounted to the substrate first with the electrical trace patterns subsequently being applied to the substrate to interconnect the electronic components. Electrical connections between the components and the metal film may be made by conventional techniques such as soldering, wire bonding, spring contact or conductive adhesive. Further, the electrical connection may also be made by a metal film directly, wherein the metal film may be applied in a three-dimensional pattern such that the metal film is continuous from the substrate to the electronic component. In this way, the electronic components may be attached to the substrate first and the electrical circuit and the electrical connection to the component may be made in one metal film patterning step. It is further noted that pattern metal films applied via the present inventive techniques may be combined with pattern insulating films to form conductor/insulator/conductor circuits, thereby enabling higher circuit density or multiple electrochromic electrode busses to be applied on the same substrate.

Yet another application includes applying metal films used as a base layer that enhances solder wetting or solderability of a substrate. The metal film solder layer is used to enhance electrical conductivity, provide an electrical connection and/or mechanical bonding connection to a component, and/or to provide a gas tight hermetic seal. For example, the edges of each of the substrates associated with the electrochromic device may be coated with a metal film. The substrates are then fixtured together with a uniform gap therebetween, with the edges of the substrate subsequently soldered together. It is noted that the solder in this example would form a hermetic gas tight edge seal and would protect the electrochromic media contained between the substrates. This is an improvement over solders and soldering techniques that allow direct soldering to glass, ceramic and conductive metal oxides, as the previously-known techniques sometimes provide poor solder adhesion due to process variability. Another example of the usefulness of the present inventive technique is to fill the port edge of an electrochromic element by coating the edge with a metal film and allowing the fill hole associated with the electrochromic element to be soldered shut subsequent to filling the device with the electrochromic material or electrolyte. Again, this is an improvement over past techniques as the present inventive technique provides an easier to perform and more robust process.

Still yet another application of the present inventive process is to apply reflective or transflective mirror-like metal films on at least one of the second, third, and fourth surfaces of the associated electrochromic device. The metal film may be applied to an entire surface or be patterned to selectively coat portions of the targeted surfaces to provide transparent, transflective, or reflective mirror-like portions. These layers may function as an electrode if positioned on surface three, or an electrode supplement bus if positioned on surface four. Further, these films may be made thick enough such that only a point, short line or small area electrical contact is needed. A sheet resistance of less than 10 ohms per square is preferable, less than 1 ohm per square is more preferred, and less than 0.5 ohm per square is most preferred, and may be easily accomplished via the present inventive techniques.

Another application of the present inventive techniques is to provide a reflective metal film ring patterned about a perimeter of one of the associated substrates, wherein the metal ring would serve to hide an associated seal area and provide a mirror surface that would complement the mirror surface on the second substrate. This metal film would provide between a 1 mm and 8 mm wide ring which would cover the perimeter of the first substrate and could also overlap onto the edge thereof. This metal film may function as the electrical bus or supplement the electrical bus for the second surface transparent conductive electrode. Further, a metal film as positioned on the second surface may be applied under the transparent conductive electrode, on top of the transparent conductive electrode, or sandwiched between transparent conductive layers. Moreover, a grayish or blackish colored metal layer would serve to hide the seal area and could function as an electrical bus and aesthetically complement the reflector on the second substrate.

One method of patterning films with high resolution is with inkjet printing, as previously noted. Printed details of 10 μm or below may be achieved with inkjet printing, while the amount of ink deposited during each pass can be tightly controlled and adjusted with accuracy. The print film thickness may be varied by controlling the individual ink drop size, the frequency of ink droplet generation, the speed at which the ink head transverses the substrate and the number of passes the ink head makes over the surface being printed. It is noted that inks loaded with large particles cannot be effectively ink jet printed as large particles may clog the ink jet head and tend to settle out of the solution, especially if the solution viscosity is low. As a result, nano particle metallic loaded inks are preferable. Specifically, metal-containing inks that may be ink jet printed and yield metallic films with near bulk metal properties are ink solutions containing nano particles of silver, nickel, copper, gold, silver-copper, silver-palladium, palladium-gold, etc. Transparent conductive oxide coating may also be formed from inks containing nano particles of transparent oxide materials such as indium tin oxide (ITO), antimony doped tin oxide (ATO), aluminum doped zinc oxide (AZO), indium doped zinc oxide (IZO) or similar metal oxide systems. It is noted that the metallic particles size of these inks must be small enough to form a specularly reflective mirror-like film upon evaporation of the carrier solvent.

An approach where inkjet imaging may be used to deposit metal films utilizes a two phase UV curing ink, wherein the two phase ink is jetted onto a substrate and UV cured to produce a solid two phase polymer matrix. One polymer phase is selectively solvated from the matrix, while the remaining polymer phase forms a honeycomb structure and contains a metal deposition catalyst. Metal is then deposited onto the catalyst containing polymer honeycomb using donor metallization fluid. Copper, silver, gold, nickel and cobalt with good conductivity and adhesion may be deposited using this technique.

Yet another approach where inkjet printing may be utilized to deposit metal films involves thermal decomposition of organometallic precursors to form metal. These organometallic precursors are solvated with the organometallic solution the inkjetted onto a hot substrate (100° to 250° C.). The heat of the substrate flashes-off the solvent and the organometallic compound decomposes into the metal which deposits onto the substrate. This application/decomposition process can be done in air, in an inert gas or reducing atmosphere if the metal is sensitive to oxidation. Organometallic precursors may also be combined with nanoparticles to assist in sintering the nanoparticles together upon curing.

Solutions or inks containing nano particle based, organometallic precursor based or metallic ion based, may be selectively applied by methods other than ink jetting. Other techniques include utilizing a nano vapor spray and/or an ultrasonic spray technique to apply solutions of copper, tungsten molybdenum, silver, gold, etc. to produce metal films with a quality similar to vacuum processes. Such techniques have been employed by Fujimori Technical Laboratory Ltd. of Japan to produce silver based mirrors. Ultrasonic spray technology may also be utilized to apply liquid coatings such as flux, photo resist and conductive inks on various substrates with precision, such as those employed by Ultrasonic Systems Inc. of Haverhill, Mass. and Sono-Tek Corporation of Milton, N.Y. Further, small auger pumps and solenoid jetting pumps attached to programmable XYZ motion control to dispense fluids in patterns, lines or dots with accuracy may be utilized, such as those systems employed by Asymtek of Carlsbad, Calif. The systems may be controlled by vision monitoring and servo-driven controlled pumps attached to precision motion control equipment to dispense conductive and non-conductive materials in three dimensional shapes and patterns accurately.

Still further, the application of conductive and non-conductive materials may be accomplished by spraying heated powders thru apertures directly onto surfaces in patterned configurations. Moreover, laser techniques may also be utilized, including directly transferring material onto a substrate by irradiating a ribbon coated with a material to be deposited with a pulsed laser beam. Material is evaporated from the ribbon, which is held in close proximity to the substrate, by the laser beam and is transferred to the substrate. The deposited material is patterned by moving the substrate under the laser beam/ribbon mechanism with a precision XY motion control. The deposition may be done in air or in an inert, reducing or oxidizing atmosphere if desired. Conductive and insulating materials may also be deposited by a plasma spray process, which includes projecting a hot material toward a substrate to be coated, where the projected spray condenses. In one approach, powdered material is fed into a hot flame, melted and then directed toward the substrate by the combustion gas or a combination of the combustion gas and an inert gas, wherein the hot particles condense on the substrate to be coated. In another approach, the material is fed in wire form into a head that melts the material with an electrical discharge. The material is then directed toward the substrate by a steam of inert gas. In each approach the deposited material can be patterned by spraying the material through a mask or aperture while moving the deposition head or the substrate with precision motion control. Another technique is an electroless metal deposition process that includes sensitizing a glass surface with a solution of palladium chloride or tin chloride. A silver solution, which is typically composed of silver nitrate dissolved in aqueous ammonia, is applied to the substrate along with an organic reductant. The silver ion is reduced to silver metal by the organic reductant and deposits on the substrate as a metallic film. By selectively applying the silver solution, the deposited silver film can be patterned.

The surface topography, morphology or roughness is typically not a significant concern in most electrical applications dealing with metal coatings, however, the surface topography can become critical when the coatings are used in an optical application. Specifically, if the surface roughness becomes too large then the coating will have appreciable non-specular reflectivity or haze. The degree of roughness, in most applications, is often the first to be addressed when addressing problems associated with haze as it may have a negative visual appearance and not necessarily a functional problem, such as that associated with conductivity. In the case of optical applications, such as many described herein, the presence of objectionable haze is considered a worst case scenario. Further, roughness may have other negative consequences at levels much less than those needed to form objectionable haze. Previous attempts to counter problems associated with haze include utilizing higher priced metals which exhibit higher reflectivity. The effects of varying levels of morphology or surface roughness as discussed in this application, have been calculated using thin film modeling techniques. Specifically, calculations as included herein regarding morphology or surface roughness were calculated using a commercially-available thin film program called TFCalc, as available from Software Spectra, Inc. of Portland, Oreg.

Figure 5:
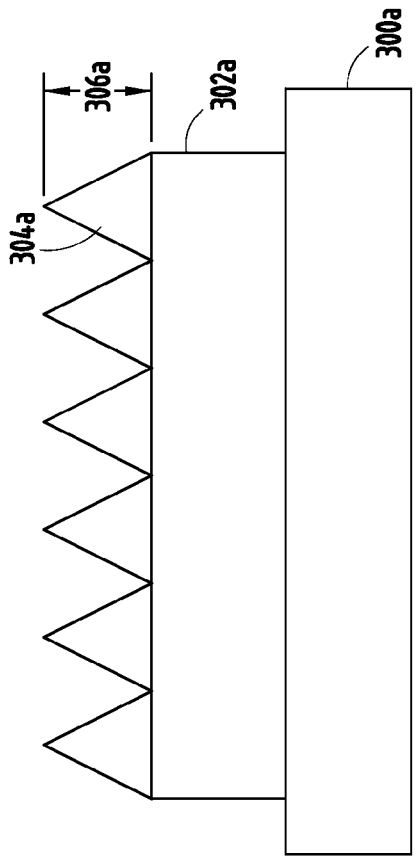
FIG. 5 is a schematic cross-sectional view of a substrate and a bulk metal coating with a larger crystalyte structure.
Figure 6:
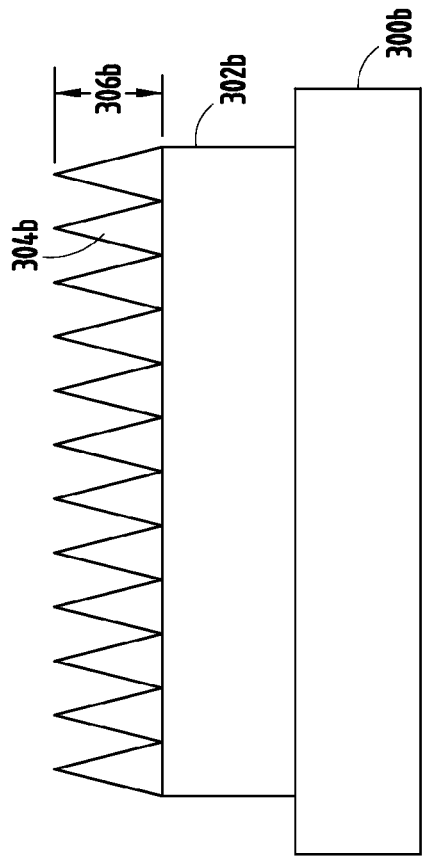
FIG. 6 is a schematic cross-sectional view of a substrate and a bulk metal coating with a small crystalyte structure.

In the present examples, the roughness is defined as the mean peak-to-valley distance. FIG. 5 illustrates a first roughness scenario, wherein a substrate 300a is coated with a bulk metal coating 302a exhibiting a first roughness 304a with large crystallites, while FIG. 6 illustrates a second roughness scenario, wherein a substrate 300b is coated with a bulk metal coating 302b exhibiting a second roughness 304b with relatively small crystallites. It is noted that each examples display a similar peak-to-valley distance 306a, 306b. Additionally, both examples have the same void to bulk ratios. A relatively thin layer approximations may be made by considering the layer as a single homogeneous layer with a uniform refractive index, however, this approximation does not work well for mixed layers. Specifically, if the thickness of the metal layer becomes too large then the roughness is not approximated well by a single fixed refractive index, and in those cases roughness is approximated as a several slices of different ratios of void and bulk material. The present examples utilize a Bruggeman EMA methodology for calculating the effective medium approximations of the refractive index of a mixed layer.

Tables 1-3 show the effect of roughness thickness on the reflectivity (Y) of the surface for silver, chrome and rhodium, respectively. It is noted that the reflectivity drops off as the roughness increases for each of these metals. Depending upon the application, the amount of acceptable roughness will vary, however, the roughness should be preferably less than 60 nanometers, more preferably less than 40 nanometers, even more preferably less than 20 nanometers, even more preferably less than 10 nanometers and most preferably less than 5 nanometers. As noted above, these preferred ranges depend upon the particular application involved. The surface roughness can be critical for first surface reflectance.

TABLE 1

Effect of roughness thickness on reflectivity of Ag coatings
Silver

| Bulk Thickness (nm) | Roughness (nm) | Reflectance (Cap Y) % |
| --- | --- | --- |
| 350 | 0 | 98.5 |
| 350 | 5 | 95.2 |
| 350 | 10 | 91.3 |
| 350 | 15 | 87.1 |
| 350 | 20 | 82.7 |
| 350 | 25 | 78.4 |
| 350 | 30 | 74.2 |
| 350 | 35 | 70.4 |
| 350 | 40 | 66.8 |
| 350 | 45 | 63.6 |
| 350 | 50 | 60.8 |
| 350 | 55 | 58.3 |
| 350 | 60 | 56.2 |

TABLE 2

Effect of roughness thickness on reflectivity of chrome coatings
Chrome

| Bulk Thickness (nm) | Roughness (nm) | Reflectance (Cap Y) % |
|---|---|---|
| 40 | 0 | 65.9 |
| 40 | 5 | 64.6 |
| 40 | 10 | 62.2 |
| 40 | 15 | 59.0 |
| 40 | 20 | 55.2 |
| 40 | 25 | 51.3 |
| 40 | 30 | 47.7 |
| 40 | 35 | 44.5 |
| 40 | 40 | 41.9 |
| 40 | 45 | 39.8 |
| 40 | 50 | 38.3 |
| 40 | 55 | 37.2 |
| 40 | 60 | 36.5 |

TABLE 3

Effect of roughness thickness on reflectivity of rhodium coatings
Rhodium

| Bulk Thickness (nm) | Roughness (nm) | Reflectance (Cap Y) % |
|---|---|---|
| 40 | 0 | 76.9 |
| 40 | 5 | 74.8 |
| 40 | 10 | 71.6 |
| 40 | 15 | 67.2 |
| 40 | 20 | 62.1 |
| 40 | 25 | 56.4 |
| 40 | 30 | 50.7 |
| 40 | 35 | 45.2 |
| 40 | 40 | 40.3 |
| 40 | 45 | 36.0 |
| 40 | 50 | 32.4 |
| 40 | 55 | 29.6 |
| 40 | 60 | 27.4 |

The present inventive processes and methods are utilized to provide conductive layers preferably having a bulk resistivity of less than or equal to 150 µΩ·cm, more preferably less than or equal to 100 µΩ·cm and most preferably less than or equal to 50 µΩ·cm; a peak-to-valley roughness of less than or equal to 20 nm, more preferably of less than or equal to 10 nm and most preferably of less than or equal to 5 nm; a reflectance preferably greater than or equal to 35%; more preferably greater than or equal to 55%; and most preferably greater than or equal to 70%, and that exhibit spectral reflectance wherein the image is retained.

Several experiments were conducted utilizing a variety of application processes and curing techniques, the details of which are provided below.

EXAMPLE 1

Inkjet Silver Conductor AG-IJ-G-100-S1 ink from Cabot Printable Electronics and Displays (Albuquerque, N. Mex.) was applied to flat, 1.6 mm thick, soda lime glass using a JetDrive III driver and MJ-AB-01 40 µm inkjet head both obtained from MicroFab Technologies (Plano, Tex.). Printing parameter settings were typical for inkjet printing. After the conductive ink was printed, separate samples were cured in a convection oven or kiln at temperatures of 200, 300, 400, and 500° C. for 20 minutes. The thickness of the cured films was measured using a profilometer (Dektek) and bulk resistivity was calculated.

| Cure Temperature (° C.) | Cure Time (min) | Thickness (µm) (avg. of 3) | Bulk Resistivity (µΩ · cm) (avg. of 3) |
|---|---|---|---|
| 200 | 20 | 0.87 | 10.63 |
| 300 | 20 | 1.06 | 4.24 |
| 400 | 20 | 0.86 | 2.90 |
| 500 | 20 | 1.00 | 3.11 |

The adhesion between the film and the substrate was evaluated by a tape peel test. After curing, adhesive tape was applied to the film and removed with a peeling action. A rating of 1 indicates the film was removed by the tape. A rating of 5 indicates the film was not affected by the tape removal. Intermediate numbers are assigned by how much of the film is removed by the tape removal.

| Cure Temperature (° C.) | Cure Time (min) | Adhesion (1-5) |
|---|---|---|
| 200 | 20 | 1 |
| 300 | 20 | 3 |
| 400 | 20 | 5 |
| 500 | 20 | 5 |

EXAMPLE 2

Silverjet DGH 50LT-25CIA ink from Advanced Nano Products (Seoul, Korea) was applied to flat, 1.6 mm thick, soda lime glass using similar apparatus and printing parameter settings as Example 1. After the conductive ink was printed, separate samples were cured in a convection oven or kiln at temperatures of 250, 350, 450, and 560° C. for 20 minutes. The thickness of the cured films was measured using a profilometer (Dektek) and bulk resistivity was calculated.

| Cure Temperature (° C.) | Cure Time (min) | Thickness (µm) (avg. of 3) | Bulk Resistivity (µΩ · cm) (avg. of 3) |
|---|---|---|---|
| 250 | 20 | 3.45 | 11.64 |
| 350 | 20 | 3.06 | 10.69 |
| 450 | 20 | 2.50 | 9.65 |
| 560 | 20 | 1.48 | 3.34 |

The adhesion between the film and the substrate was evaluated by a tape peel test as described in Example 1. A rating of 1 indicates the film was removed by the tape. A rating of 5 indicates the film was not affected by the tape removal. Intermediate numbers are assigned by how much of the film is removed by the tape removal.

| Cure Temperature (° C.) | Cure Time (min) | Adhesion (1-5) |
|---|---|---|
| 250 | 20 | 1 |
| 350 | 20 | 1 |
| 450 | 20 | 5 |
| 560 | 20 | 5 |

EXAMPLE 3

Silverjet DGH 50HT-50CIA ink from Advanced Nano Products (Seoul, Korea) was applied to flat, 1.6 mm thick, soda lime glass using similar apparatus and printing parameter settings as Example 1. After the conductive ink was printed, separate samples were cured in a convection oven or kiln at temperatures of 250, 350, 450, and 560° C. for 20 minutes. The thickness of the cured films was measured using a profilometer (Dektek) and bulk resistivity was calculated.

| Cure Temperature (° C.) | Cure Time (min) | Thickness (μm) (avg. of 3) | Bulk Resistivity (μΩ · cm) (avg. of 3) |
|---|---|---|---|
| 250 | 20 | 5.38 | 18.17 |
| 350 | 20 | 5.29 | 17.23 |
| 450 | 20 | 5.31 | 17.89 |
| 560 | 20 | 3.28 | 7.39 |

The adhesion between the film and the substrate was evaluated by a tape peel test as described in Example 1. A rating of 1 indicates the film was removed by the tape. A rating of 5 indicates the film was not affected by the tape removal. Intermediate numbers are assigned by how much of the film is removed by the tape removal.

| Cure Temperature (° C.) | Cure Time (min) | Adhesion (1-5) |
|---|---|---|
| 250 | 20 | 1 |
| 350 | 20 | 1 |
| 450 | 20 | 5 |
| 560 | 20 | 5 |

EXAMPLE 4

Silverjet DGH 50HT-50CIA ink from Advanced Nano Products (Seoul, Korea) was applied to flat, 1.6 mm thick, soda lime glass using similar apparatus and printing parameter settings as Example 1. After the conductive ink was printed, separate samples were cured in a kiln at 560° C. for 20, 40, and 60 minutes. The thickness of the cured films was measured using a profilometer (Dektek) and bulk resistivity was calculated.

| Cure Temperature (° C.) | Cure Time (min) | Thickness (μm) (avg. of 3) | Bulk Resistivity (μΩ · cm) (avg. of 3) |
|---|---|---|---|
| 560 | 20 | 0.72 | 2.45 |
| 560 | 40 | 0.60 | 2.24 |
| 560 | 60 | 0.78 | 1.94 |

The adhesion between the film and the substrate was evaluated by a tape peel test as described in Example 1. A rating of 1 indicates the film was removed by the tape. A rating of 5 indicates the film was not affected by the tape removal. Intermediate numbers are assigned by how much of the film is removed by the tape removal.

| Cure Temperature (° C.) | Cure Time (min) | Adhesion (1-5) |
|---|---|---|
| 560 | 20 | 5 |
| 560 | 40 | 5 |
| 560 | 60 | 5 |

EXAMPLE 5

Parmod VLT GXA-100 Silver ink from Parelec, Inc. (Rocky Hill, N.J.) was applied to flat, 1.6 mm thick, soda lime glass using stencils to form 2.54 mm×7.5 cm traces. Separate samples were then cured in a convection oven or kiln at temperatures of 250, 300, and 350° C. for 20 minutes. The thickness of the cured films was measured using a micrometer and bulk resistivity was calculated.

| Cure Temperature (° C.) | Cure Time (min) | Thickness (μm) (avg. of 3) | Bulk Resistivity (μΩ · cm) (avg. of 3) |
|---|---|---|---|
| 250 | 20 | 14.00 | 7.6 |
| 300 | 20 | 15.70 | 6.2 |
| 350 | 20 | 10.00 | 5.7 |

The adhesion between the film and the substrate was evaluated by a tape peel test as described in Example 1. A rating of 1 indicates the film was removed by the tape. A rating of 5 indicates the film was not affected by the tape removal. Intermediate numbers are assigned by how much of the film is removed by the tape removal.

| Cure Temperature (° C.) | Cure Time (min) | Adhesion (1-5) |
|---|---|---|
| 250 | 20 | 3 |
| 300 | 20 | 5 |
| 350 | 20 | 5 |

EXAMPLE 6

Parmod VLT GXA-100 Silver ink from Parelec, Inc. (Rocky Hill, N.J.) was applied to flat, 1.6 mm thick, soda lime glass using stencils to form 2.54 mm×7.5 cm traces. Separate samples were then cured in a convection oven or kiln at a temperatures of 300° C. for 10, 20, and 30 minutes. The thickness of the cured films was measured using a micrometer and bulk resistivity was calculated.

| Cure Temperature (° C.) | Cure Time (min) | Thickness (μm) (avg. of 3) | Bulk Resistivity (μΩ · cm) (avg. of 3) |
|---|---|---|---|
| 300 | 10 | 11.67 | 5.2 |
| 300 | 20 | 15.67 | 6.8 |
| 300 | 30 | 18.33 | 7.9 |

The adhesion between the film and the substrate was evaluated by a tape peel test as described in Example 1. A rating of 1 indicates the film was removed by the tape. A rating of 5 indicates the film was not affected by the tape removal. Intermediate numbers are assigned by how much of the film is removed by the tape removal.

| Cure Temperature (° C.) | Cure Time (min) | Adhesion (1-5) |
|---|---|---|
| 300 | 10 | 5 |
| 300 | 20 | 5 |
| 300 | 30 | 5 |

EXAMPLE 7

Figure 7:
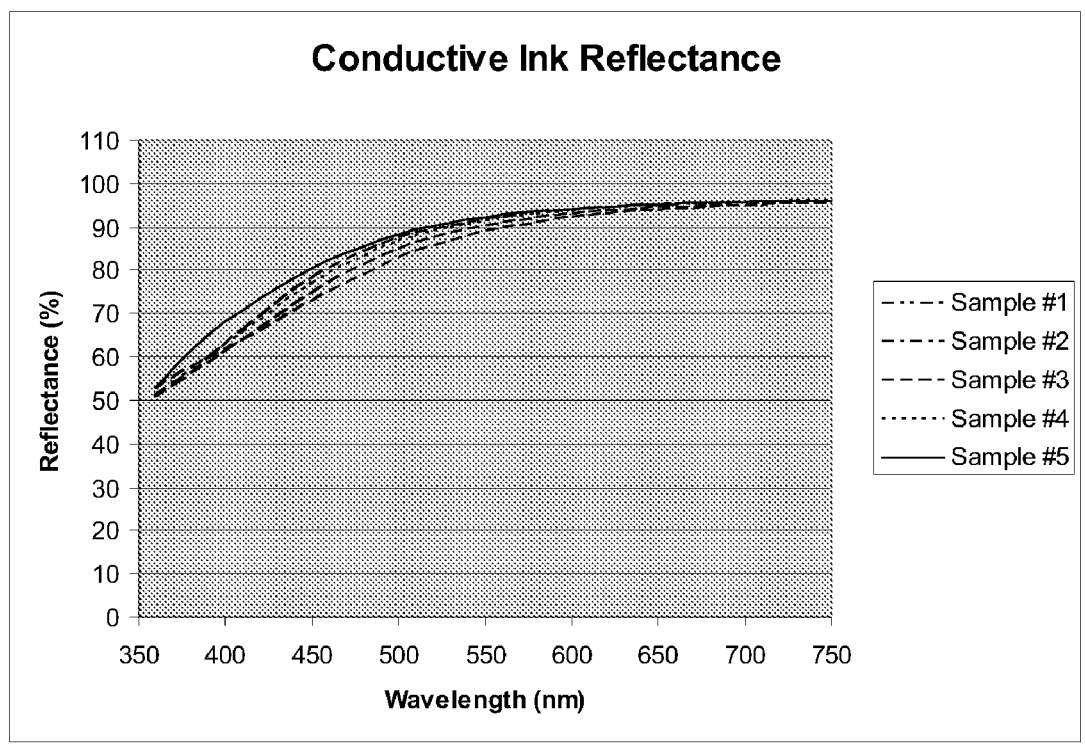
FIG. 7 is a graph of a wavelength versus reflectance for Example No. 7.

Inkjet Silver Conductor AG-IJ-G-100-S1 ink from Cabot Printable Electronics and Displays (Albuquerque, N. Mex.) was applied to flat, 1.6 mm thick, soda lime glass using a JetDrive III driver and MJ-AB-01 40 μm inkjet head both obtained from MicroFab Technologies (Plano, Tex.). Printing parameter settings were typical for inkjet printing. After the conductive ink was printed, separate samples were cured in a kiln at 200° C. for 20 minutes. The reflectivity of the cured films were measured using a spectrophotometer (Gretag Macbeth Coloreye 7000A). The reflectivity results can be seen in FIG. 7.

The invention claimed is:

1. A method for manufacturing an electrochromic element, the method comprising:
   providing a first substrate having a first surface, a second surface opposite the first surface, and a first edge surface;
   providing a second substrate having a third surface facing the second surface, a fourth surface opposite the third surface, and a second edge surface;
   providing an electrochromic medium located between the first and second substrates, wherein the electrochromic medium has a light transmission that is variable upon the application of an electric field thereto; and
   depositing a conductive layer on at least a portion of at least a select one of the first surface, the second surface, the first edge surface, the third surface, the fourth surface, and the second edge surface, wherein the deposition of the conductive layer is accomplished at substantially atmospheric pressure and includes depositing at least a select one of metallic particles, an organometallic, a metallo-organic, and combinations thereof, and wherein the conductive layer has a bulk resistivity of less than or equal to 150 μΩ·cm.

2. The method of claim 1, wherein the step of depositing the conductive layer provides the conductive layer with a bulk resistivity of less then or equal to 100 μΩ·cm.

3. The method of claim 2, wherein the step of depositing the conductive layer provides the conductive layer with a bulk resistivity of less then or equal to 50 μΩ·cm.

4. The method of claim 1, wherein the step of depositing the conductive layer provides the conductive layer with a peak-to-valley roughness of less than or equal to 20 nm.

5. The method of claim 4, wherein the step of depositing the conductive layer provides the conductive layer with a peak-to-valley roughness of less than or equal to 10 nm.

6. The method of claim 5, wherein the step of depositing the conductive layer provides the conductive layer with a peak-to-valley roughness of less than or equal to 5 nm.

7. The method of claim 1, wherein the step of depositing the conductive layer provides the conductive layer with a reflectance of greater than or equal to 35% at a wavelength of about 550 nm.

8. The method of claim 7, wherein the step of depositing the conductive layer provides the conductive layer with a reflectance of greater than or equal to 55% at a wavelength of about 550 nm.

9. The method of claim 8, wherein the step of depositing the conductive layer provides the conductive layer with a reflectance of greater than or equal to 70% at a wavelength of about 550 nm.

10. The method of claim 1, wherein the step of depositing the conductive layer provides the conductive layer as reflective.

11. The method of claim 1, wherein the step of depositing the conductive layer provides the conductive layer as transmissive.

12. The method of claim 1, wherein the step of depositing the conductive layer provides the conductive layer as transflective.

13. The method of claim 1, wherein the step of depositing the conductive layer includes depositing metallic nanoparticles.

14. The method of claim 1, wherein the step of depositing the conductive layer further includes depositing an organometallic metal precursor.

15. The method of claim 1, wherein the step of depositing the conductive layer includes at least a select one of ink jet printing, ultrasonic spraying, auger pumping, and jet pumping.

16. The method of claim 1, further comprising curing the conductive layer.

17. The method of claim 16, wherein the curing step includes curing the conductive layer with the use of at least a select one of UV light, a microwave, and convective heating.

18. The method of claim 1, wherein the step of depositing the conductive layer includes providing the conductive layer as an electrode deposited on at least a select one of the second surface and the third surface.

19. The method of claim 1, wherein the substrate on which the conductive layer is deposited comprises glass.

20. The method of claim 1, wherein the step of depositing the conductive layer further comprises at least a select one of chemical vapor deposition, flame spray deposition, and laser sintering.

21. The method of claim 1, wherein the step of depositing the conductive layer comprises depositing of at least one of an electrical bus conductor, an electrical resistance heater, a metallic line, a metallic stripe, a metallic grid, a metallic pattern, a conductive trace for electronic circuitry, a base layer providing enhanced solder wetting, a specularly-reflective metallic film, a specularly-reflective transflective metallic film, and a metallic film ring.

22. The method of claim 1, wherein the step of depositing a conductive layer comprises a depositing of an electrical bus conductor having an electrical resistance of less than 10 Ohms per linear foot.

23. The method of claim 1, wherein the step of depositing a conductive layer comprises a depositing of an electrical bus conductor having an electrical resistance of less than 5 Ohms per linear foot.

24. The method of claim 1, wherein the step of depositing a conductive layer comprises a depositing of an electrical bus conductor having an electrical resistance of less than 1 Ohms per linear foot.

25. The method of claim 1, wherein the step of depositing a conductive layer comprises depositing of a conductive layer containing at least one of silver, nickel, copper, gold, silver-copper, silver-palladium, palladium-gold, and transparent conductive oxide.

26. The method of claim 25, wherein the depositing a conductive layer comprising transparent conductive oxide includes depositing a conductive layer containing at least one of indium-tin oxide, antimony-dopes tin oxide, aluminum-doped zinc oxide, and indium-doped zinc oxide.

* * * * *